United States Patent Office

2,706,203
Patented Apr. 12, 1955

2,706,203

SEPARATING 4- AND 5-NITROANTHRANILIC ACIDS

Otto Stallmann, Bridgeton, N. J., assignor to E. I. du Pont de Nemours and Company, Wilmington, Del., a corporation of Delaware No Drawing. Application April 21, 1954,
Serial No. 424,753

4 Claims. (Cl. 260—518)

This invention relates to a process for separating isomeric compounds, and more particularly to the separation of 4-nitroanthranilic acid from the isomeric 5-nitroanthranilic acid. Both of these isomers are useful as dye intermediates and as intermediates for the preparation of other chemicals.

For years it has been known that the 4- and 5-nitroanthranilic acids may be prepared by subjecting 4-nitrophthalimide to the Hofmann reaction with concentrated sodium hydroxide and chlorine or chlorinated lime. This reaction, however, produces an isomeric mixture of the two nitroanthranilic acids, which according to the literature are usually separated from organic solvents, more particularly xylene. See, for instance, the article by Seidel and Bittner, Berichte 34, 4351 (1901) and Monatshefte 23, 415 (1902). The separation of these two isomers from solvents such as xylene is not commercially feasible, and no process has been described in the literature which would appear to be satisfactory for the isolation, more particularly of the 4-nitroanthranilic acid.

It is an object of the present invention to provide a simple and relatively inexpensive method for the separation of 4-nitroanthranilic acid from the isomeric 5-nitroanthranilic acid which does not involve the use of organic solvents. A further object of the invention is to provide a process whereby the 4-nitroanthranilic acid is recovered in a desirable crystalline form of sufficient purity for ordinary uses so that further purification is unnecessary.

The process of the present invention is based on the discovery that the 4-nitroanthranilic acid is many times more soluble than 5-nitroanthranilic acid when in the form of their potassium salts, and that the 5-nitroanthranilic acid potassium salt can be salted out of a mixture of the potassium salts of the 4- and 5-nitroanthranilic acids by the addition of relatively soluble inorganic potassium salts such as potassium chloride.

According to the present invention, a mixture of the 4- and 5-nitroanthranilic acids normally produced by the Hofmann reaction on 4-nitrophthalimide are converted to the potassium salts by the addition of potassium hydroxide. Potassium chloride or other relatively soluble potassium salt is then added to the solution an an amount sufficient to give from 2% to 15% of KCl solution. After stirring the slurry for from one to three hours, the relatively insoluble potassium salt of 5-nitroanthranilic acid which is separated out is filtered off and the filter cake is washed with a 5% to 10% potassium chloride solution to remove any adhering 4-nitro derivative. The potassium salt of the 4-nitroanthranilic acid which remains dissolved in the filtrate can be recovered as the free acid by simply acidifying the filtrate with a mineral acid and filtering off the 4-nitroanthranilic acid. It may also be recovered as the sodium salt from the filtrate by a salting out process using sodium chloride or other relatively soluble sodium salt.

If the potassium salt of the 4-nitroanthranilic acid is desired, it can be precipitated from the filtrate by cooling and filtering although this separation is not as complete as where the sodium salt is used since it has been found that the sodium salt of the 4-nitroanthranilic acid is much less soluble than the potassium salt.

The isomeric mixture of the 4-nitroanthranilic acid and the 5-nitroanthranilic acid in the form of their potassium salts may be produced directly by carrying out the Hofmann reaction with potassium hydroxide in place of sodium hydroxide, with subsequent separation of the 5-nitro isomer as the potassium salt directly from the solution in which it is formed, and final isolation of the 4-nitroanthranilic acid in the form of the free acid or the sodium salt directly from the filtrate.

The present invention is based on the surprising discovery that the potassium salt of the 4-nitroanthranilic acid is many times more soluble than the potassium salt of the 5-nitroanthranilic acid. This was a surprising discovery because it was known that the sodium salts of the two isomers, particularly in a sodium chloride solution, have solubilities so close to each other that they cannot be satisfactorily separated as the sodium salts.

The concentration of the potassium chloride or other relatively soluble potassium salt from which the 5-nitroanthranilic acid in the form of its potassium salt can be isolated substantially free from the potassium salt of the 4-nitroanthranilic acid is not critical, although the preferred concentration of the potassium chloride will be between 2% and 15%. Below about 2% KCl concentration the difference in solubility of the isomers is still quite large, but at the concentrations of the isomers in the aqueous solution normally handled, at least 2% of potassium chloride is required to effect a complete salting out of the 5-isomer. Thus, a lower yield of the 5-nitroanthranilic acid is obtained and the purity of the 4-nitro derivative is impaired when too small an amount of potassium chloride is used in the salting operation. Amounts above 15% appear to give no added advantage and merely add to the cost of the separation process.

It is of course understood that the temperature at which the process is operated will determine the relative amount of potassium chloride to be used. The amount of potassium chloride required will be less at lower temperatures than when higher temperatures are used although the difference in isomer solubility also exists at increased temperatures. It has been found that the separations can be satisfactorily carried out at ordinary room temperatures or as high as 40° C. The preferred operation is to stir the KCl-isomer mixture at room temperature or higher, and, after cooling, filter off the potassium salt of the 5-nitroanthranilic acid that has separated out. Good separations have been obtained by filtering at from 20° to 35° C. When filtering temperatures much above 40° are used, the potassium salt of the 5-nitro derivative has sufficient solubility in the solution to render the 4-nitro derivative less pure when isolated.

While control of the pH during the process is not absolutely necessary, it is preferred to carry out the separation of the 5-nitroanthranilic acid from the solution at a pH of from 7.9 to 8.3. If the pH is below 7.9, free acid may be present with the result of loss in yield or quality of the anthranilic acids. Alkalinities about 8.3 require an unnecessary amount of alkali which does not add to the efficiency of the separation. These pH ranges can readily be determined and controlled by the use of Brilliant Yellow and phenolphthalein test papers.

Because the 4-nitroanthranilic acid is much less soluble in the form of the sodium salt than in the form of the potassium salt, it may be readily isolated from the potassium salt solution by the addition of sodium chloride after the 5-nitro derivative has been filtered off.

The following examples are given to illustrate the invention. Where parts are employed, they are by weight.

Example 1

The isomer mixture used in this example was the isolated reaction product obtained from a Hofmann reaction on 4-nitrophthalimide as carried out by Seidel and Bittner, Monat. 23, 421–423 (1902). The solid isomer mixture analyzed 98.1% pure by nitrite analysis and contained 0.27% moisture. It consisted of 60% to 65% of 4-nitroanthranilic acid and about 35% to 40% of 5-nitroanthranilic acid.

10 g. of the above isomer mixture was slurried in 50 ml. of distilled water containing 3.13 g. of dissolved potassium chloride. The free acids were then converted to their potassium salts by adding, with agitation, 12.3 ml. of a 25% (by weight) potassium hydroxide solution. The resulting mixture was alkaline to Brilliant Yellow and remained so during the two hour agitation period which was conducted at room temperature. The insoluble crystalline material present in the slurry was then filtered off at room temperature and the filter cake washed with two 5 ml. portions of a 5% KCl solution. The filter cake yielded 3.72 g. of dry potassium 5-nitroanthranilate. This potassium salt was dissolved in 100 ml. of water and the solution acidified with 2 ml. of concentrated hydrochloric acid. The precipitate was filtered off and 2.90 g. of dry 5-nitroanthranilic acid (about 30% yield based on the original mixture) obtained whose purity was at least 98% based on melting point (278° C.) and infra-red analysis.

The filtrate obtained from the original alkaline slurry was heated to about 70° C. on the steam bath and acidified to strong Congo acidity with concentrated HCl. The slurry of crystalline precipitate so obtained was cooled to room temperature and filtered off, and after drying yielded 5.98 g. of 4-nitro-anthranilic acid, MR 257°–261° C., yield about 60%, based on the original mixture. Infrared analysis indicated a purity of 94.6%.

*Example 2*

A slurry was prepared as described in Example 1, using 15 g. of the same Hofmann reaction mixture, 75 ml. of water, 21.7 ml. of a 25% KOH solution and 4.8 g. of KCl. After adjusting the alkalinity to a distinct and permanent alkaline test on Brilliant Yellow paper and a very slightly alkaline test to phenol-phthalein (i. e. pH about 7.2 to 8.3), another 1.03 g. of KCl was added to bring the total KCl concentration to 5%. The slurry was then stirred at 28° to 30° for 2 hours and the crystals filtered off at 30° C. The filter cake was washed first with 10 ml. of a 6% KCl solution and then twice with two 5 ml. portions. After dissolving the filter cake in 200 ml. of water at from 50° to 60° C., the solution was acidified with concentrated HCl to strong Congo acidity to precipitate the free acid. After cooling to 30° C., the slurry was filtered, the cake washed with water, and dried at 80° C. In this way 4.35 g. (29% recovery based on weight of dry starting material) of nearly 100% pure 5-nitroanthranilic acid was obtained, having a melting point of 281° C.

The filtrate from the original slurry was heated to 85° C. and salted with 11 g. of sodium chloride. The solution was agitated and cooled slowly to 35° C. and in this way a precipitate of large crystals was obtained. The crystals were filtered off and yielded 11.8 g. of dry sodium salt of 4-nitroanthranilic acid containing some sodium chloride and potassium chloride. Conversion of a portion of this material to the free acid as described in Example 1 showed that it contained the equivalent of 69% of 4-nitroanthranilic acid, MR 255–260° C. This corresponds to a 54.3% recovery based on the dry isomer mixture.

*Example 3*

A slurry of 50 g. of the Hofmann mixture in 250 cc. of water was prepared as in Example 1. To this slurry, 54 g. of 25% KOH solution was added and then 39.5 g. of KCl. The slurry was stirred at 20° C. and filtered.

The yellow precipitate was dissolved in water and the free acid precipitated with HCl as described in Example 1. In this way, 5-nitroanthranilic acid of over 98% purity and melting at 275° C. was obtained. The yield of 5-nitroanthranilic acid obtained in this way was 27% of the total Hofmann mixture.

The filtrate from the yellow precipitate was treated with HCl as in Example 1 and the crystalline precipitate of 4-nitroanthranilic acid filtered off at room temperature. In this way, 50.4% of the original isomer mixture was recovered as 4-nitroanthranilic acid of 90% purity and M. R. 257°–260° C.

*Example 4*

A slurry of 50 g. of the Hofmann isomer mixture of Example 1 in 250 cc. of water, 73.4 g. of 25% KOH, 62.5 g. of KCl and sufficient concentrated HCl to adjust the pH to 7.9 to 8.3 (about 4 cc.) was stirred at 70° C. for 2 hours, cooled to 34° C. and filtered.

The yellow filter cake of the potassium salt of 5-nitroanthranilic acid was dissolved in water and the free acid precipitated with HCl as in Example 1. A 33% yield, based on the original mixture, of 5-nitroanthranilic acid, melting point 277° C. and of 99% purity was obtained.

The filtrate from the yellow precipitate was chilled to 20° C. and crystals of potassium 4-nitroanthranilate filtered off. This compound was crimson in color, and had a solubility in water at from 28° to 30° of 14.6%. This salt was dissolved in water and the free acid obtained by precipitating with HCl in the usual way. 4-nitroanthranilic acid was obtained in a 40.8% yield having a melting point of 258° C. and a purity of 91%.

The filtrate from the red potassium 4-nitroanthranilate was also treated with HCl and in this way a further 20.6% of the 4-nitro-free acid was also obtained, having a melting range of 260°–262° C. and a purity of 92%.

Thus, the recovery of the 5-nitro isomer was 33%, and the overall recovery of the 4-nitro was 61.4% to give a total recovery from the original Hofmann mixture of 95.6%.

*Example 5*

A solution of 98 parts of KOH in 228 parts of water was cooled to 0° C. and 31.5 parts of chlorine gas passed into the solution. This solution was then added slowly to a mixture of 68.2 parts of 4-nitrophthalimide, 34 parts of KOH and 190 parts of water. As the KOCl solution was added, the temperature rose to about 80° C.

The reaction mass was held at about 60° to 70° C. for one-half hour and the pH adjusted to from 8 to 9 with about 171 parts of concentrated hydrochloric acid to between Brilliant Yellow and phenolphthalein. This gave a KCl concentration in the total solution of from 10% to 15%. The resulting slurry was cooled to 20° C., stirred for about one hour at that temperature and the yellow precipitate, consisting essentially of the potassium salt of the 5-nitroanthranilic acid, was filtered off.

The filtrate was acidified to blue on Congo red paper with about 50 parts of concentrated HCl and the mass stirred at room temperature for 1.5 hours. The slurry was then filtered and the filter cake washed with water until the washings were acid free. After drying, the 4-nitroanthranilic acid thus obtained weighed 32 parts and had a melting point of 253° C.

The original yellow precipitate was washed with water and was then dissolved in 1000 parts of water and acidified with about 50 parts of concentrated HCl. The slurry thus obtained was stirred at about 30° C. for one-half hour and then filtered and washed with water. In this way, 15.2 parts of 5-nitroanthranilic acid were obtained which melted at 280° C.

The advantage of this process is that it may be carried out in water, using relatively inexpensive inorganic salts. The products are isolated in sufficiently high purity that they may be used directly without further purification in the preparation of the many dyes for which the 4- and 5-nitroanthranilic acids are useful.

I claim:

1. A process for the separation of 4-nitroanthranilic acid and 5-nitroanthranilic acid from a normally occurring aqueous mixture, which consists in converting the acids to their potassium salts, adding to such solution from 2% to 15% of a relatively soluble potassium salt based on the weight of the solution, allowing the 5-nitroanthranilic acid in the form of the potassium salt to separate out, and filtering it from the solution.

2. A process for the separation of 4-nitroanthranilic acid and 5-nitroanthranilic acid from a normally occurring aqueous mixture, which consists in converting the acids to their potassium salts, adding to such solution from 2% to 15% of a relatively soluble potassium salt based on the weight of the solution, allowing the 5-nitroanthranilic acid in the form of the potassium salt to separate out, filtering it from the solution, and isolating the 4-nitroanthranilic acid from the filtrate.

3. A process for the separation of 4-nitroanthranilic acid and 5-nitroanthranilic acid from a normally occurring aqueous mixture, which consists in converting the acids to their potassium salts, adding to such solution from 2% to 15% of a relatively soluble potassium salt based on the weight of the solution, allowing the 5-nitroanthranilic acid in the form of the potassium salt to separate out, filtering it from the solution, and acidifying the filtrate to precipitate the 4-nitroanthranilic acid.

4. A process for the separation of 4-nitroanthranilic acid and 5-nitroanthranilic acid from a normally occurring aqueous mixture, which consists in converting the acids to their potassium salts, adding to such solution from 2% to 15% of a relatively soluble potassium salt based on the weight of the solution, allowing the 5-nitroanthranilic acid in the form of the potassium salt to separate out, filtering it from the solution, and salting out the 4-nitroanthranilic acid as a sodium salt by the addition of sodium chloride to the filtrate.

References Cited in the file of this patent

Springer et al., J. Chem. Soc. (London), 1945, p. 627.